US012129555B2

(12) United States Patent
Wang et al.

(10) Patent No.: US 12,129,555 B2
(45) Date of Patent: Oct. 29, 2024

(54) PREPARATION METHOD AND DEVICE OF COMPOSITE COATING FOR RESIN MATRIX COMPOSITE

(71) Applicant: Army Academy of Armored Forces, Beijing (CN)

(72) Inventors: Haidou Wang, Beijing (CN); Ming Liu, Beijing (CN); Qiqing Peng, Beijing (CN); Guozheng Ma, Beijing (CN); Yanfei Huang, Beijing (CN); Xinyuan Zhou, Beijing (CN); Zhiguo Xing, Beijing (CN); Weiling Guo, Beijing (CN); Lihong Dong, Beijing (CN)

(73) Assignee: Army Academy of Armored Forces, Beijing (CN)

( * ) Notice: Subject to any disclaimer, the term of this patent is extended or adjusted under 35 U.S.C. 154(b) by 276 days.

(21) Appl. No.: 17/729,923

(22) Filed: Apr. 26, 2022

(65) Prior Publication Data
US 2023/0340655 A1 Oct. 26, 2023

(51) Int. Cl.
C23C 4/134 (2016.01)
C23C 4/02 (2006.01)
C23C 4/11 (2016.01)

(52) U.S. Cl.
CPC ............... C23C 4/134 (2016.01); C23C 4/02 (2013.01); C23C 4/11 (2016.01)

(58) Field of Classification Search
CPC .. C23C 4/134; C23C 4/02; C23C 4/11; C23C 4/129; C23C 4/18; C23C 24/04;
(Continued)

(56) References Cited

U.S. PATENT DOCUMENTS

2006/0062996 A1 3/2006 Chien
2012/0295825 A1* 11/2012 Dorfman ............. C22C 32/0068
508/151
(Continued)

FOREIGN PATENT DOCUMENTS

CN 105755422 A * 7/2016
CN 107552360 A * 1/2018
(Continued)

*Primary Examiner* — Dah-Wei D. Yuan
*Assistant Examiner* — Nga Leung V Law

(57) ABSTRACT

The disclosure discloses a preparation method of a composite coating for a resin matrix composite, comprising the following steps: preparing ceramic-resin composite powders which comprise $Al_2O_3$ ceramic, a thermosetting resin and a curing agent and are semi-thermosetting resin powders; and respectively spraying pure $Al_2O_3$ ceramic powders and the composite powders on the surface of the resin matrix composite by supersonic atmospheric plasma spraying to form a ceramic-resin composite coating, wherein the pure $Al_2O_3$ ceramic powders are fed into jet flow in a manner of feeding powder inside a spray gun, and the composite powders are fed into jet flow in a manner of feeding powder outside the spray gun. Correspondingly, the disclosure also provides a preparation device of a composite coating for a resin matrix composite.

7 Claims, 9 Drawing Sheets

(58) Field of Classification Search
CPC ......... C23C 24/08; C23C 28/00; C23C 28/40;
C23C 28/42; Y02T 50/40; B05D 7/24;
B05D 1/12; B05D 3/002; B05D 7/02;
C04B 35/10; C04B 35/62222; C09D
1/00; C09D 7/61; C09D 161/06; C08K
2003/2227
See application file for complete search history.

(56) References Cited

U.S. PATENT DOCUMENTS

2017/0137949 A1* 5/2017 Bahraini Hasani .... C25D 15/00
2017/0239787 A1* 8/2017 Deleuze .................. C23C 4/129

FOREIGN PATENT DOCUMENTS

CN     112702458 A  *  4/2021  ............... B05D 7/24
CN     113736330 A     12/2021

* cited by examiner

PREPARATION METHOD AND DEVICE OF COMPOSITE COATING FOR RESIN MATRIX COMPOSITE

CROSS REFERENCE TO RELATED APPLICATIONS

This application claims foreign priority of Chinese Patent Application No. 202210377638.1, filed on Apr. 12, 2022 in the China National Intellectual Property Administration, the disclosures of all of which are hereby incorporated by reference.

TECHNICAL FIELD

The disclosure relates to the field of materials, particularly to the field of material coatings, more particularly to a preparation method and device of a composite coating for a resin matrix composite.

BACKGROUND ACCORDING TO THE DISCLOSURE

A resin matrix composite is a polymer matrix composite (PMC) with carbon fibers, aramid fibers, ceramic particles and the like as an enhancement material. Compared with other traditional structural materials, the resin matrix composite has a series of outstanding advantages of light weight, high specific strength, good anti-fatigue break, corrosion resistance, good structure stability, large-area integral molding and the like, has been widely applied to high and new technological fields such as aerospace and shipbuilding, and is capable of realizing the purposes of lost structure weight, reduced cost, improved economic benefits and the like. However, the application of the resin matrix composite is limited due to poor heat resistance, ablation resistance and the like.

In order to overcome the above limitations of the poor heat resistance and ablation resistance of the resin matrix composite, it is necessary to cover the surface of the resin matrix composite with a coating by adopting a suitable spraying method.

A plasma spraying technology is widely applied to preparation of thermal barrier and wear-resistant coatings. Plasma jet flow has the characteristics of high temperature, high speed, large temperature gradient and the like, and therefore spraying materials are extremely widely selected. As one of the spraying materials, aluminum oxide $Al_2O_3$ ceramic has high strength, good heat resistance and wear resistance, rich resources and cheap price, and is an ideal material for heat-resisting wear-resisting coatings via plasma spraying. However, $Al_2O_3$ has a melting point of more than 2000° C., and the thermal decomposition temperature of the resin matrix composite is only 300-500° C., so use of $Al_2O_3$ ceramic as the coating component of the resin matrix composite realizes the characteristics of heat resistance and wear resistance but cannot make the resin matrix composite decomposed, which has become a simultaneously considered difficult problem in the field of materials. At present, there are no researches on direct plasma spraying of an $Al_2O_3$ coating on the surface of the resin matrix composite.

SUMMARY OF PRESENT INVENTION

The objective of the disclosure is to provide a preparation method of a composite coating for a resin matrix composite, thereby avoiding the thermal expansion difference between a coating and the resin matrix composite and overcoming the defects of poor heat resistance and ablation resistance of the resin matrix composite by utilizing the characteristics of heat resistance and wear resistance of the $Al_2O_3$ ceramic On the one hand, the disclosure provides a preparation method of a composite coating for a resin matrix composite, comprising the following steps: preparing ceramic-resin composite powders which comprise $Al_2O_3$ ceramic, a thermosetting resin and a curing agent and are semi-thermosetting resin powders; and respectively spraying pure $Al_2O_3$ ceramic powders and the composite powders on the surface of the resin matrix composite (herein also called a resin matrix or a matrix for short) by supersonic atmospheric plasma spraying to form a ceramic-resin composite coating, wherein the pure $Al_2O_3$ ceramic powders are fed into jet flow in a manner of feeding powder inside a spray gun, and the composite powders are fed into jet flow in a manner of feeding powder outside the spray gun.

Accordingly, by a thermoplastic or thermosetting resin and adding a certain amount of curing agent, the prepared composite powders are semi-thermosetting composite powders, the $Al_2O_3$ ceramic powders in the composite powders are insufficiently melted, the thermoplastic or thermosetting resin is sufficiently melted to the greatest extent but is not decomposed, and the thermal expansion difference between the coating and the matrix can be relieved while improving heat-resisting and wear-resisting performances of the coating.

Furthermore, the supersonic atmospheric plasma spraying (SAPS) technology has a high heat source temperature and has the characteristic of temperature gradient, can make ceramic particles sufficiently melted and meanwhile allows heating time and heating distance to be shortened to facilitate synchronous melting of ceramic and resin. Moreover, since SAPS has a higher jet flow speed, in the process of preparing the coating, on the one hand, the sufficiently melted particles are more sufficiently spread after impacting the matrix, and on the other hand, the sufficiently melted particles can impact the matrix at higher kinetic energy so as to be flattened, bonding strengths between particles and between the coating and the matrix are increased.

Furthermore, the SAPS of the disclosure adopts a "double-channel and double-temperature zone" powder feeding mode, the pure $Al_2O_3$ ceramic powders are fed into jet flow in a manner of feeding powders inside the spray gun, and the ceramic-resin composite powders are fed into jet flow in a manner of feeding the powders outside the spray gun, so that the two powders are fed into the jet flow in jet flow zones with different temperatures, thereby further helping the synchronous melting of the two spraying fed materials; and the composite coating with continuous gradient change of components can be prepared.

Preferably, the preparing ceramic-resin composite powders also comprises the following steps: mixing the $Al_2O_3$ ceramic, the thermosetting resin and the curing agent, granulating via agglomeration, drying and forming; wherein, a ratio of the $Al_2O_3$ ceramic to the thermosetting resin to the curing agent is 50.000%: 45.455%: 4.545% (proportions are calculated based on a separate ratio of the thermosetting resin to the curing agent, that is, 1000 kg of thermosetting resin requires 100 kg of curing agent), the thermosetting resin is phenolic resin PF; the curing agent is hexamethylenetetramine; and screening the $Al_2O_3$ ceramic, the thermosetting resin and the curing agent after being mixed through a powder sieve to obtain the composite powders with a particle size of 0.3-70 μm and a core-shell structure.

Accordingly, the prepared composite powders are also called $Al_2O_3$—PF composite powders, comprising 50% of $Al_2O_3$ and 50% of PF and having a particle size of 0.3-70 μm, thereby facilitating that the composite powder simultaneously has characteristics of each component and conveniently adjusting ratios of the addition amount of the composite powders to the addition amounts of other powders. Especially, ceramic particles on the outer layer of the composite powder with the core-shell structure can greatly keep the inner core resin not to be decomposed, the synchronous melting of the ceramic and the resin can be realized through heat transfer of ceramic, which is crucial to improvement of coating quality. In addition, through introduction of the phenolic aldehyde (PF) resin into the $Al_2O_3$ coating, preparation of the $Al_2O_3$—PF composite coating can not only relive the heat expansion difference between the coating and the matrix and greatly improve the bonding strength of the coating and the matrix but also avoid the introduction of a conducting material so as to improve the use reliability of the resin matrix composite in the field of insulation.

Preferably, the supersonic atmospheric plasma spraying also comprises the following steps: simultaneously spraying the composite powders and the pure $Al_2O_3$ ceramic powders, and changing an addition amount proportion of each powder so that ceramic and resin components in the composite coating realizes continuous gradient change.

Starting from the interface between the resin matrix and the coating, the resin PF component in the coating gradually decreases from 100% to 0%, and meanwhile the ceramic component in the coating gradually increases from 0% to 100%, so as to complete the transition from the resin matrix to the ceramic coating with the continuous gradient change of the resin and the ceramic composite coating, gently reduce the thermal conductivity and the thermal expansion coefficient of the coating, and slow down the thermal expansion difference between the coating and the matrix so as to greatly improve the bonding strength between the matrix and the coating.

Preferably, the supersonic atmospheric plasma spraying also comprises the following steps: alternatively spraying the composite powders and the pure $Al_2O_3$ ceramic powders for many times to form a lasagna type multi-layer structure.

The composite powders and the pure $Al_2O_3$ ceramic powders are sprayed in turn, that is, the pure $Al_2O_3$ ceramic powders are sprayed once or several times, and then the composite powders are sprayed once or several times. Alternately spraying depends on the formed composite coating with a multi-layer structure, which not only improves the bonding strength between the matrix and the coating, but also reduces the control difficulty in the aspects of addition amount and timing of the two powders.

It is noted that the above simultaneous spraying and alternate spraying manners can be mutually replaced or combined to be used for the preparation process of the coating, which is not limited by the disclosure.

Preferably, a main spraying gas is argon, and the gas flow of the argon is 58 $L·min^{-1}$-62 $L·min^{-1}$; a secondary gas is hydrogen, and the gas flow of the hydrogen is 12 $L·min^{-1}$-18 $L·min^{-1}$; a powder feeding gas is argon, and a spraying distance is 140-160 mm; the pure $Al_2O_3$ ceramic powders are fed by a first powder feeder, and the composite powders are fed by a second powder feeder; wherein, the pure $Al_2O_3$ ceramic powders: the powder feeding amount of the composite powders is 3.6:5.4 $g·min^{-1}$-3.6: 20 $g·min^{-1}$; a spraying voltage is 90-110 V; a spraying current is 350-450 A; the second powder feeder has an axial distance of 90-110 mm; the temperature of the resin matrix composite is 100-150° C.

The melting point of the pure $Al_2O_3$ ceramics is about 2050° C., so the pure $Al_2O_3$ powders are fed inside the spray gun and melted in high-temperature and high-speed plasma jet flow to obtain a high flight speed; the $Al_2O_3$—PF composite powders are fed outside the spray gun, and the second powder feeder has a the axial distance set as being far away from a nozzle outlet and close to the matrix, so as to feed the composite powder at a low temperature interval to ensure that the PF resin is melted but is not decomposed by heating. The $Al_2O_3$ ceramic in the composite powder is insufficiently melted, but the PF resin is preserved by the $Al_2O_3$ ceramic as much as possible and well melted, so as to form a coating structure with an $Al_2O_3$ ceramic as a skeleton and filled with the PF resin, so that the heat resistance and bonding strength of the coating are improved.

Preferably, the gas flow of the argon is 60 $L·min^{-1}$; the gas flow of the hydrogen is 15 $L·min^{-1}$; the spraying distance is 150 mm; the pure $Al_2O_3$ ceramic powder: the powder feeding amount of the composite powder is 3.6: 12 $g·min^{-1}$; a spraying voltage is 100 V; a spraying current is 420 A; the second powder feeder has an axial distance of 100 mm, a radial distance of 2.5 mm and a jet flow angle of 90°; the temperature of the resin matrix composite is 120° C.

Accordingly, the prepared ceramic-resin composite coating has a good thermal insulation ability and a low thermal conductivity, and the bonding strength of the coating can reach an ideal value of 26 MPa.

Preferably, the surface of the resin matrix composite is subjected to linear reciprocating spraying by using a supersonic atmospheric plasma spray gun, and the movement speed of the spray gun is 40 m/min; the times of the spraying is 50-60 times, and the thickness of the obtained coating is 0.6-0.8 mm.

Accordingly, proper spraying speed and times allow the ceramic-resin composite powder to have appropriate melting time, so as to more facilitate the realization of the better adherence of the coating and formation on the surface of the resin matrix composite so as to improve the quality of the coating, wherein the thickness of 0.8 mm can also leave enough thickness for lathe grinding.

Preferably, prior to the supersonic atmospheric plasma spraying, the preparation method also comprises the following steps: pretreating the surface of the resin matrix composite; the pretreating comprises performing washing and sand blasting treatment on the surface of the resin matrix composite.

Accordingly, through the pretreating, oil stains on the surface of the resin matrix composite or the matrix can be removed, and the surface of the matrix has a certain roughness, thereby not only increasing the adhesive force between the matrix and the coating but also facilitating the leveling and decoration of the coating.

Preferably, the pretreating comprises: the surface of the matrix is washed with ethyl alcohol or acetone; a sand blasting material selects brown aluminum oxide with a particle size of 120-180 μm, a sand blasting atmospheric pressure of 0.3±0.05 MPa and a sand blasting angle of 70±10°, a distance between the spray gun and the surface of the resin matrix composite is 100-150 μm, and the sand blasting time is once for flat sweeping.

Accordingly, the roughness of the obtained matrix surface can be better combined with the composite coating, thereby prolonging the durability of the coating.

On the other hand, corresponding to the first aspect, the disclosure also provides a preparation device of a composite coating for a resin matrix composite for implementing the method described in the previous first aspect or any one preferred embodiment.

The technical effect of the preparation device can be seen in the technical effect illustrated in the above method, which will not be repeated here.

Therefore, the disclosure has the beneficial effects:

(1) In the disclosure, the plasma spraying of the ceramic coating is directly performed on the surface of the resin matrix composite, and therefore compared with the traditional process, the coating quality is promoted, and the thermal expansion difference between the coating and the resin matrix composite is effectively reduced.

(2) The coating prepared by the disclosure takes $Al_2O_3$ as the skeleton and is filled with the PF resin, thereby effectively improving the bonding strength and heat resistance of the coating, the bonding strength of the coating measured by using an universal tensile testing machine is 26 MPa, and the thermal conductivity and the thermal expansion coefficient of the coating measured by laser heat conduction are significantly reduced.

(3) In the disclosure, pure $Al_2O_3$ and $Al_2O_3$—PF composite powder are subjected to plasma spraying to prepare the coating, this method can directly spray two powders, thus is simple to operate and easy to popularize, and can effectively save time and cost.

(4) The $Al_2O_3$—PF composite coating prepared by the disclosure has reliable combination with the resin matrix composite and good heat resistance, can effectively protect the resin matrix composite, prolongs the service life of the material, expands the application range, and greatly improves the bonding strength between the coating and the matrix.

DETAILED DESCRIPTION OF PREFERRED EMBODIMENTS

Next, the disclosure will be further described in detail in combination with accompanying drawings, so that those skilled in the art can implement it with reference to the words in the specification.

A thermal spray coating preparation technology can adopt atmospheric plasma spraying (APS), flame spraying, supersonic atmospheric plasma spraying (SAPS), etc.

In the spraying process of atmospheric plasma jet flow, continuous overlapping and stacking is performed between particles so as to form the coating, and therefore pores are easily produced. Moreover, two or more than two materials can be simultaneously sprayed by sufficiently utilizing the characteristic of temperature gradient of plasma jet flow to form the composite coating. The defects such as pores and microcracks in the coating are important criteria to evaluate the quality of the coating, but it is also found that appropriate pores and microcracks existing in the coating can improve the heat resistance of the coating. For a heat-resistant coating, it needs to have both good heat resistance and good bonding strength. Generally, the bonding strength can be tested by a universal tensile testing machine. For the heat resistance of the coating, the thermal conductivity and the thermal expansion coefficient of the coating can be measured by laser heat conduction.

In addition, the resin matrix composite belongs to a polymer material, which often has a heat resistance temperature, and therefore a method for preparing a protective coating on the surface of the resin matrix composite (also called the matrix) is generally a low-heat-source coating preparation method such as flame spraying, cold spraying and solution-gel spraying.

Figure 1:
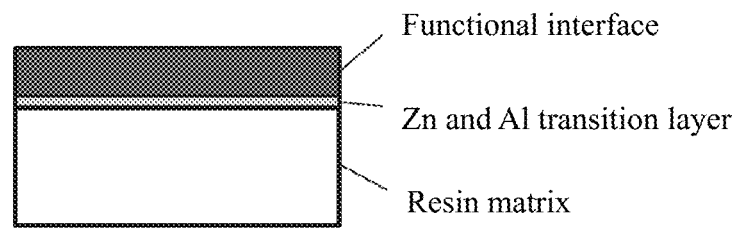
FIG. 1 is a structural diagram of a double-layer structural coating of "metal transition layer+ceramic surface layer" in the prior art.

The following three solutions are explored for the feasibility of preparing a ceramic protective coating on the surface of the resin matrix composite by using an atmospheric plasma spraying (APS) technology: solution 1 is to prepare a double-layer structure coating of "metal transition layer+ceramic surface layer" by using low-melting-point metals such as Al and Zn, as shown in FIG. 1; solution 2 is to prepare composite coatings containing two or more than two ceramic coatings; solution 3 is to prepare a ceramic coating with gradient change. The coatings prepared by these three solutions can provide a certain protection such as heat resistance and ablation resistance for the resin matrix composite, but there are still deficiencies that 1, the introduction of a metal transition layer reduces the reliability of corrosion resistance and insulation of the composite; 2, the coating has a low bonding strength (generally about 10 MPa); 3, the thermal expansion coefficients of the coating and the matrix is quite different. Compared with ordinary atmospheric plasma spraying (APS), supersonic atmospheric plasma spraying (SAPS) has higher heat source temperature and jet velocity, so it is generally considered that it is not feasible to prepare the ceramic coating on the surface of the resin matrix composite by supersonic atmospheric plasma spraying (SAPS).

Figure 2:
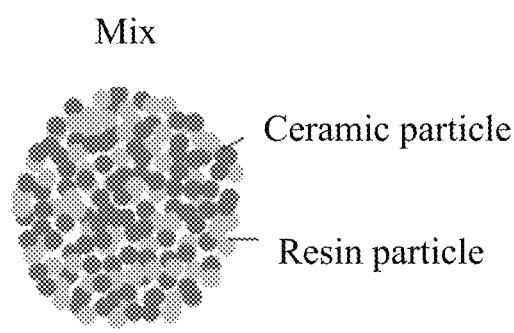
FIG. 2 is a schematic diagram showing uniform distribution of components in composite powders according to the disclosure.
Figure 3:
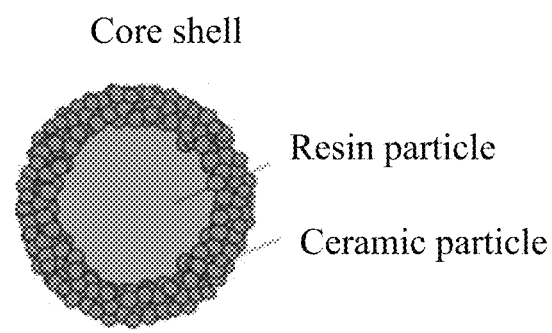
FIG. 3 is a schematic diagram of a core-shell structure of components in composite powders according to the disclosure.

However, the disclosure overcomes the above technical bias and provides a preparation method of a composite coating of a resin matrix composite, which is specifically described as follows:

1. Preparation of Ceramic-Resin Composite Powder:

(1) The composite powder can be in two forms, namely, uniform distribution of ceramics and resins in a single particle (FIG. 2); the single particle is a ceramic coated resin, forming a "shell-core" structure (FIG. 3).

(2) In particular, the resin in the composite powder is a thermosetting resin, and the prepared composite powder is a semi-thermosetting composite powder. The ceramic material used in the disclosure is $Al_2O_3$ ceramic, and the thermosetting resin used is phenolic resin (PF), but not limited to the above ceramics and resin materials.

Because the resin used in the composite powder in the disclosure is the thermoplastic resin PF and a certain curing agent is added, the curing reaction will begin to occur when being heated at 150° C., so the prepared composite powder is the semi-thermosetting composite powder. This composite powder can not only slow down the thermal expansion difference between the coating and the matrix and greatly improve the bonding strength between the coating and the matrix, but also avoid the introduction of conductive materials so as to improve the reliability of the resin matrix composite in the field of insulation.

In particular, the ceramic particles in the outer layer of the composite powder with a "core-shell" structure can greatly keep the inner core resin not to be decomposed. The synchronous melting of ceramics and resin can be realized through the heat transfer of the ceramic, which is crucial to improvement of the quality of coating.

2. The Composite Powder is Sprayed by Supersonic Atmospheric Plasma Spraying SAPS Through experiments, it is verified that the preparation of the coating by using thermal spray coating preparation technologies such as atmospheric plasma spraying, flame spraying and supersonic atmospheric plasma spraying (SAPS) cannot avoid the thermal decomposition of the resin in the semi-setting composite powder. However, it is found that the coating with excellent quality can be prepared by spraying the semi-setting composite powder only with the SAPS technology. The coating with excellent quality cannot be prepared by using other spraying methods or other forms of composite powders. The analysis shows that: (1) because SAPS has a high heat source and has temperature gradient, and therefore can make the ceramic particles fully melted and meanwhile shorten the heating time and heating distance to facilitate the synchronous melting of ceramics and resin; (2) because SAPS has a higher jet velocity, in the process of preparing the coating, on the one hand, the sufficiently melted particles can more sufficiently spread after impacting the matrix; on the one hand, the sufficiently molten particles can impact the matrix at a high kinetic energy so as to be flattened and increase the bonding strengths between particles and between the coating and the matrix.

3. The Disclosure Adopts a "Double-Channel and Double-Temperature-Zone" Powder Feeding Technology "Double-channel double-temperature-zone" powder feeding refers to feeding spraying powders into jet flow zones at different temperatures, which has the advantages that (1) a variety of spraying feed materials are synchronously melted; (2) the composite coating containing various components can be prepared; (3) the coating with continuous gradient change in components can be prepared.

Figure 4:
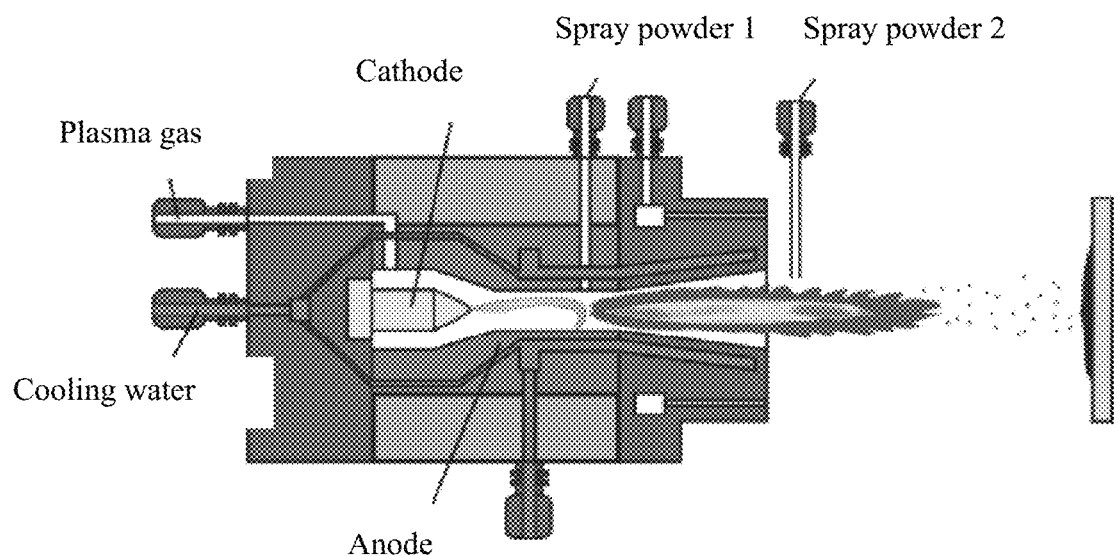
FIG. 4 is a schematic diagram of a powder feeding position close to a nozzle during the spraying in the prior art.
Figure 5:
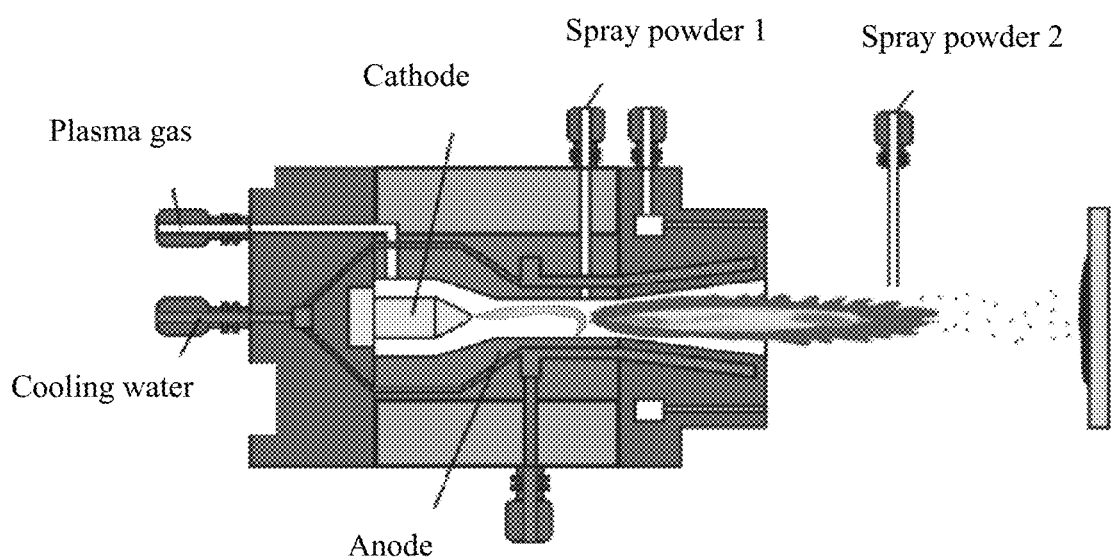
FIG. 5 is a schematic diagram of a powder feeding position close to a matrix during the spraying according to the present invention.

In the atmospheric plasma spraying (APS), the "double-channel double-temperature-zone" powder feeding technology is often used. The position of the second powder feeder is close to the outlet of the nozzle, which is as shown by the spraying powder 2 as shown in FIG. 4, to obtain the higher heat source temperature; however, it is required in the disclosure that the position of the second powder feeder is close to the matrix, which is as shown in the spraying powder 2 in FIG. 5. Through the experiment, it is verified that in the process of preparing the coating in the disclosure, if the position of the second powder feeder is close to the nozzle as shown in FIG. 4, the quality of the final coating will be greatly reduced. Since the melting point of the pure $Al_2O_3$ ceramic is about 2050° C., the pure $Al_2O_3$ powders, as the spraying powder 1 shown in FIG. 5, are fed in a manner of feeding the powder inside the spray gun and have an ideal melting degree and a flight speed under the action of high-temperature high-speed plasma jet flow. The $Al_2O_3$—PF composite powders, as the spraying powder 2 in FIG. 5, are fed in a manner of feeding the powder outside the spray gun, are in a "low-temperature zone", thus the $Al_2O_3$ in the composite powder is insufficient melted, but the PF resin is kept by $Al_2O_3$ as much as possible and well melted, so as to form a coating structure with $Al_2O_3$ as the skeleton and filled with the PF resin, thereby improving the heat resistance and bonding strength of the coating.

4. Powder Feeding

In the disclosure, the spraying powder for preparing the coating is not only the prepared ceramic resin composite powder but also the pure ceramic powder. The specific method is as follows: the pure ceramic powders are fed into the spray gun in a manner of feeding the powder inside the spray gun; the ceramic-resin composite powders are fed into jet flow in a manner of feeding the powder outside the spray gun.

Figure 7:
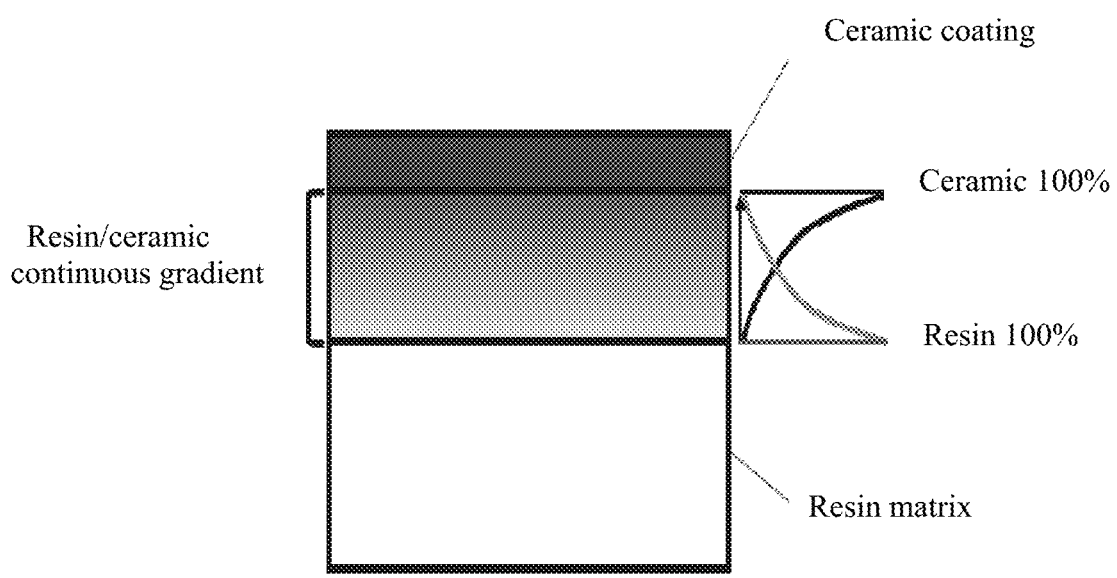
FIG. 7 is a schematic diagram of a continuous gradient structure of a composite coating according to the disclosure.
Figure 8:
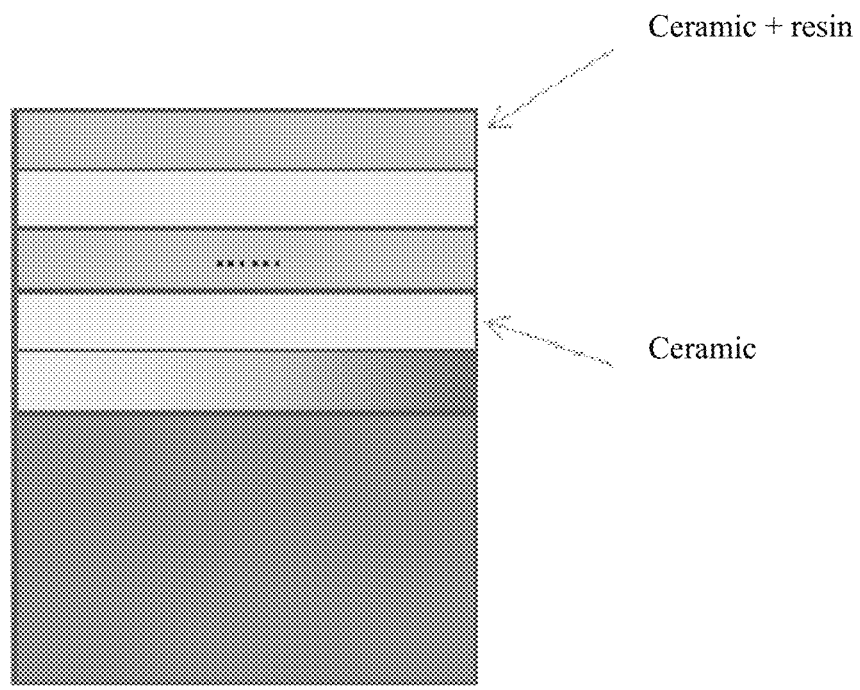
FIG. 8 is a schematic diagram of a lasagna structure of a composite coating according to the disclosure.
Figure 9:
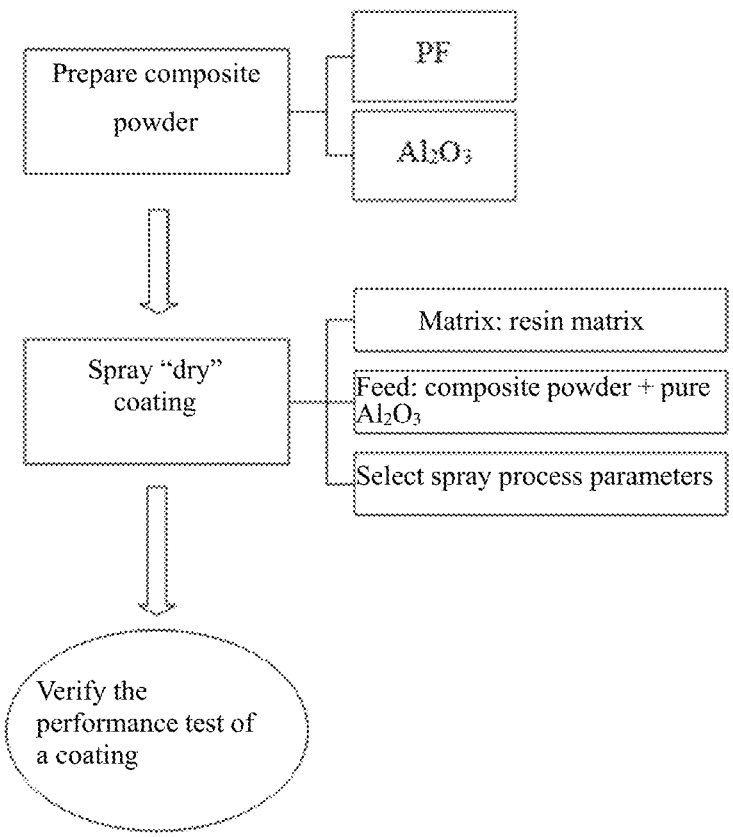
FIG. 9 is a process flow chart according to the disclosure.

In the process of spraying: (1) the pure ceramic powders and the composite powders can be simultaneously added, and the addition amount of each powder can be changed so that the coating component realizes continuous gradient change, as shown in FIG. 7; (2) each powder can be sprayed in turn, that is, the pure ceramic powders are sprayed once or several times, and then the composite powders are sprayed once or several times, so as to form a coating with a "lasagna" structure, as shown in FIG. 8.

5. Key Parameters for Coating Preparation

In the disclosure, the key parameters include: powder spraying, matrix pretreatment, spraying voltage, spraying current, spraying distance, second powder feeding distance, second powder feeding angle, matrix temperature, powder feeding proportion and gas flow.

Figure 6:
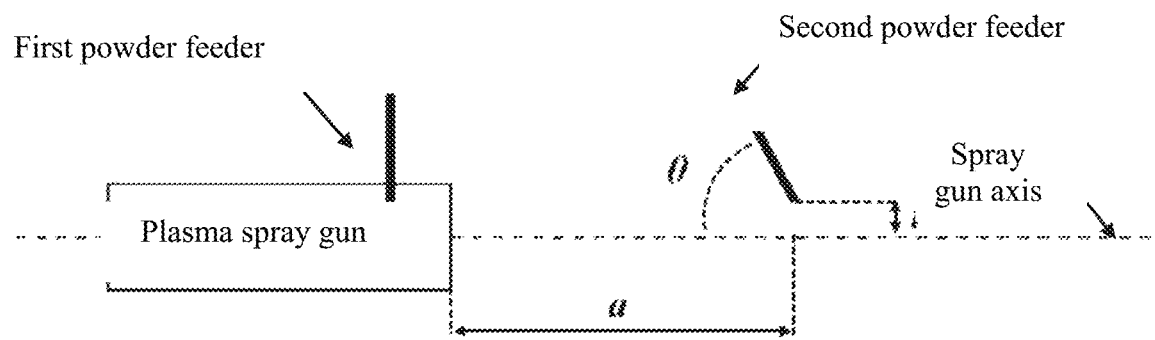
FIG. 6 is a schematic diagram showing parameters of a spray gun according to the disclosure.
Figure 10:
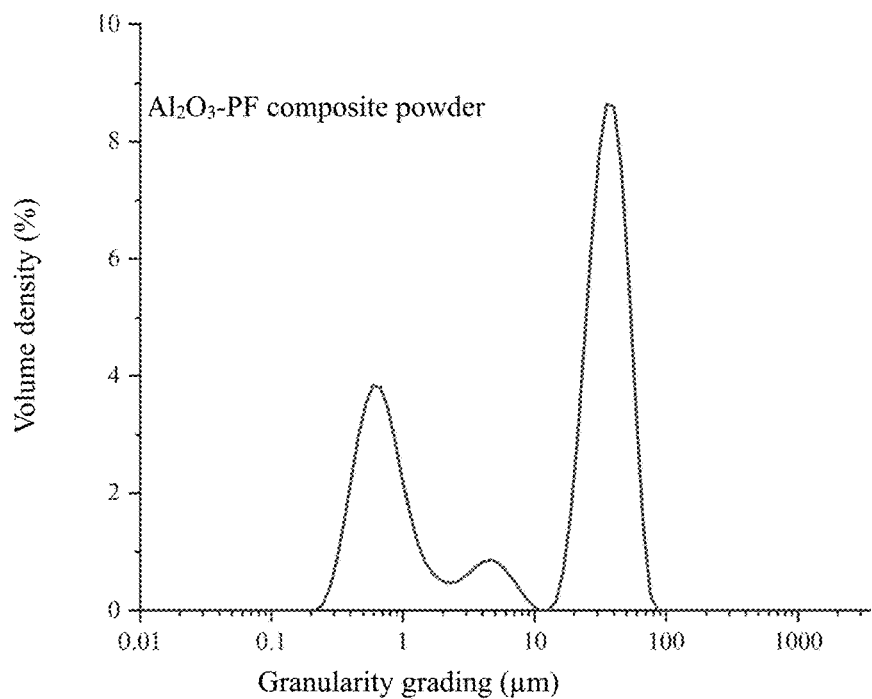
FIG. 10 is a particle size distribution diagram of $Al_2O_3$—PF composite powders used in the disclosure.

Innovation description: the disclosure explores the optimization parameters of SAPS spraying of the ceramic-resin composite coating on the surface of the resin matrix composite. Combined with the process flow chart of FIG. 8, the details are described as follows:

(1) Preparation of composite powder: $Al_2O_3$, thermosetting PF and hexamethylenetetramine (a curing agent) are mixed, granulated via agglomeration, dried and formed to prepare the $Al_2O_3$—PF composite powder with a particle size of 0.3-70 μm, as shown in FIG. 10;

(2) pretreatment of surface of matrix;

(3) spraying of the $Al_2O_3$—PF composite coating: spraying with an atmospheric plasma spray gun, and the spraying parameters are as follows: a main spraying gas is argon, and the gas flow is 58 $L·min^{-1}$-62$l·min^{-1}$; a secondary gas is hydrogen, and the gas flow is 12 $L·min^{-1}$-18$l·min^{-1}$; a powder feeding gas is argon, and a spraying distance is 140-160 mm; the powder feeding amount of the two spraying feed materials is pure Al$_2$O$_3$: the composite powder being 3.6:5.4 g·min$^{-1}$-3.6: 20 g·min$^{-1}$; a spraying voltage is 90-110 V; a spraying current is 350-450 A; the second powder feeder has an axial distance a of 20-120 mm, a radial distance r of 1-12 mm, and a jet angle θ of 70-100°, wherein, as shown in FIG. 6, the axis refers to the central axis of the spray gun or the spray gun axis, the axial distance a is a distance from the nozzle of the second powder feeder to the outlet of the spray gun along the spray gun axis, and the radial distance r is a vertical distance from the nozzle of the second powder feeder to the spray gun axis and the jet angle θ is an inclined angle of the second powder feeder relative to the spray gun axis; the spraying temperature of the resin matrix composite is 90-150° C. The spraying Al$_2$O$_3$—PF composite coating in the disclosure can also be called a spraying "dry" coating.

Figure 12:
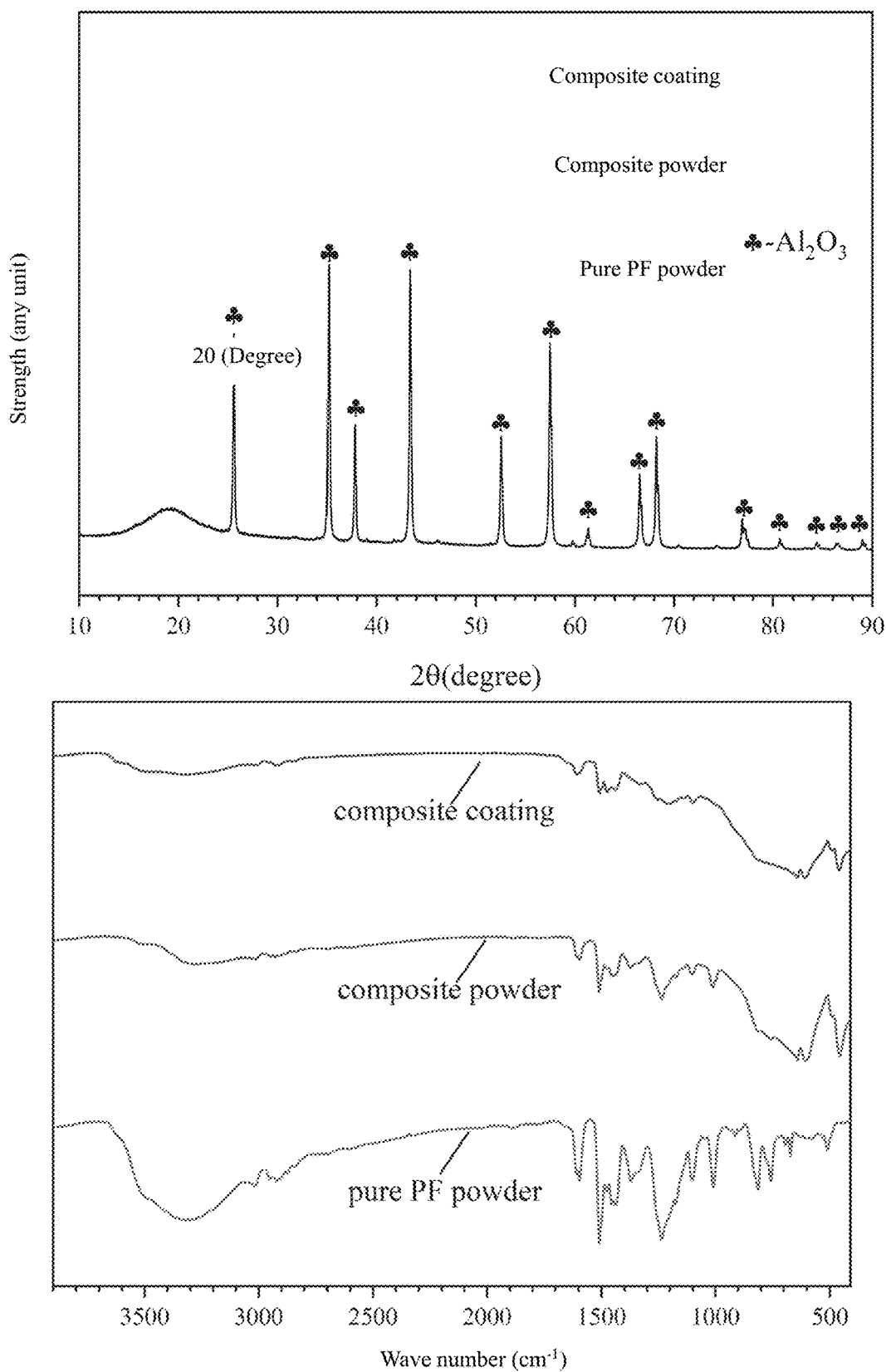
FIG. 12 is a graph showing XRD and FTIR test results of a composite coating.

(4) The Al$_2$O$_3$—PF composite coating is prepared and undergoes coating performance test verification: the X-ray diffraction (XRD) and Fourier transform infrared (FTIR) spectra of the coating show that the phase group compositions of the coating are Al$_2$O$_3$ phase and PF, as shown in FIG. 12.

Figure 13:
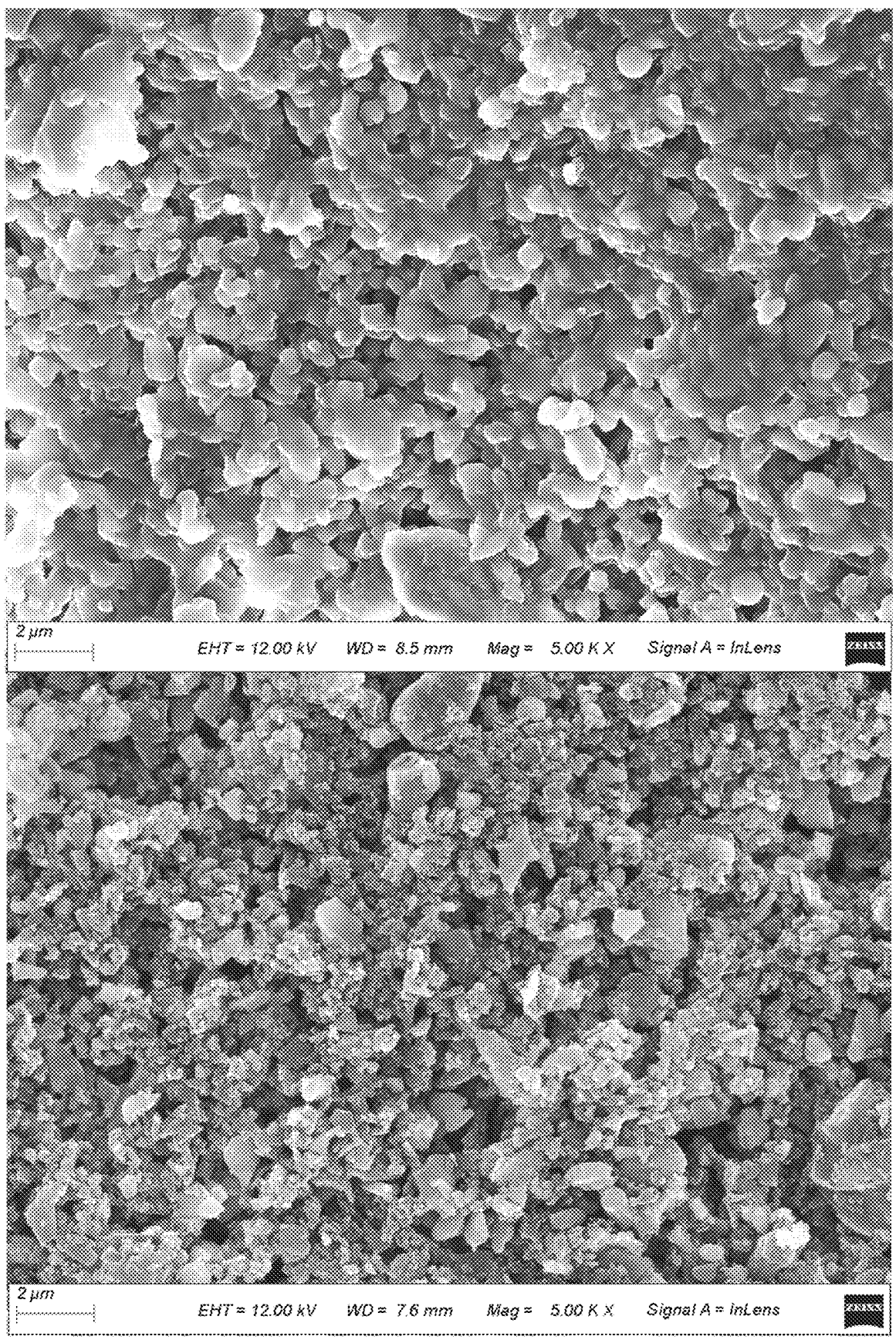
FIG. 13 is a graph showing SEM morphology of a composite coating before and after ablation.
Figure 14:
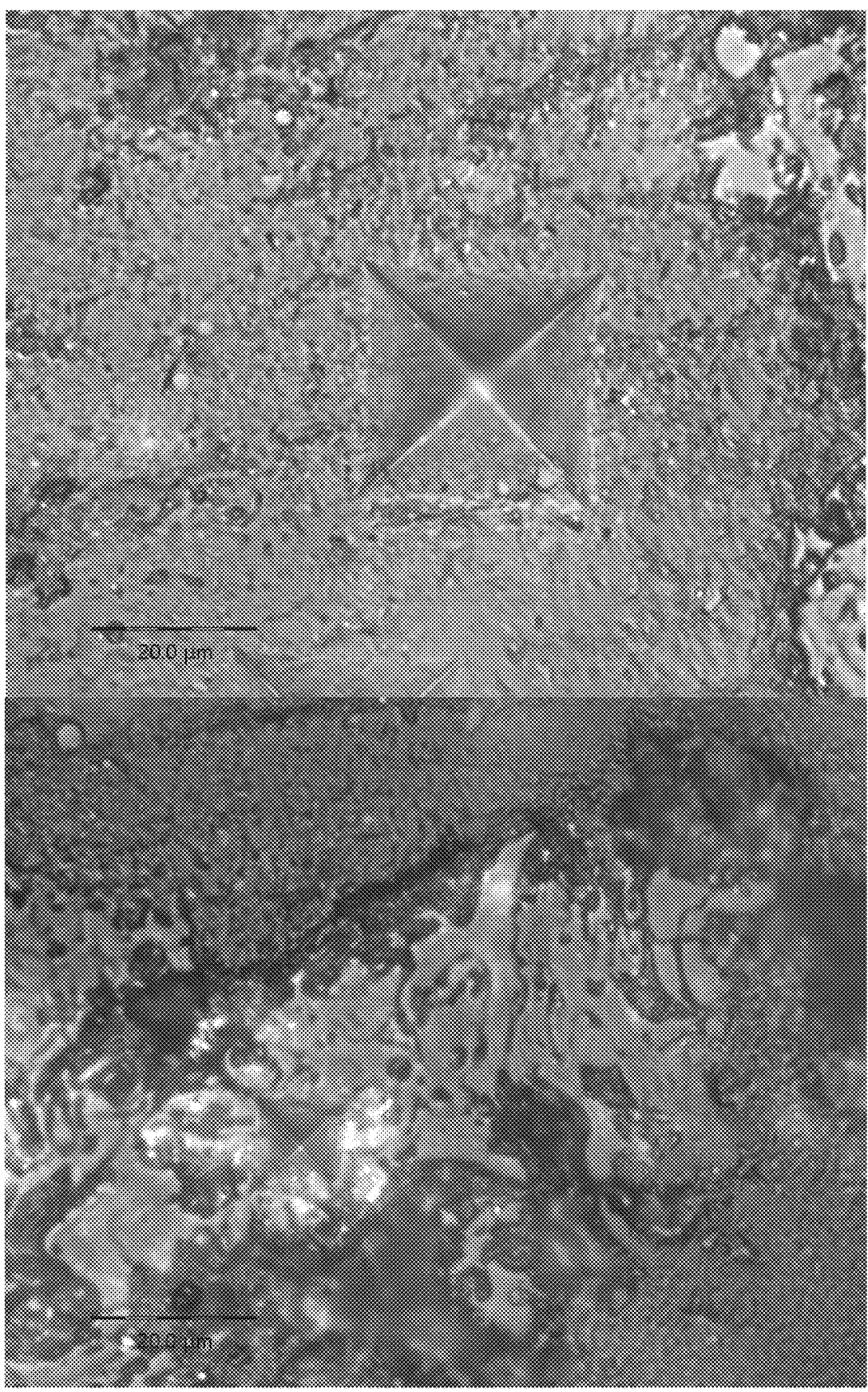
FIG. 14 is a morphology graph of an elastic modulus test indentations of a composite coating.

In addition, FIG. 13 is a graph showing scanning electron microscope (SEM) morphology of a composite coating of the disclosure before and after ablation, and FIG. 14 is a graph showing elastic modulus test indentation morphology of a composite coating of the disclosure.

Preferably, step (1) in the method for preparing the Al$_2$O$_3$—PF composite coating is as follows:

(1-1) Al$_2$O$_3$, thermosetting PF and hexamethylenetetramine (a curing agent) are mixed, granulated via agglomeration, dried and formed; the powder comprises 50.000% of Al$_2$O$_3$, 45.455% of PF and 4.545% of hexamethylenetetramine (proportions are calculated based on a separate ratio of the thermosetting resin to the curing agent, that is, 1000 kg of thermosetting resin requires 100 kg of curing agent);

(1-2) the composite powders are screened through a 100-mesh powder sieve to obtain the composite powder with a particle size of 0.3-70 μm, as shown in FIG. 10.

Preferably, step (2) in the method for preparing the Al$_2$O$_3$—PF composite coating is as follows:

(2-1) the surface of the matrix surface is washed with alcohol or acetone to remove oil stains on the surface of the matrix;

(2-2) sand blasting treatment is performed on the surface of the matrix. The sand blasting material is brown corundum with a particle size of 120-180 μm, a sand blasting pressure of 0.3±0.05 Mpa, a distance between the spray gun and the surface of the resin matrix composite is 100-150 μm, and the sand blasting time is once for flat sweeping (about 1-2s).

Preferably, step (3) in the method for preparing the Al$_2$O$_3$—PF composite coating is as follows:

(3-1) under the spraying parameters, the surface of a workpiece is sprayed with a supersonic atmospheric plasma spray gun. The "linear reciprocating" spraying method is adopted in the spraying process, and the moving speed of the spray gun is 40 m/min;

(3-2) the spraying times are 50-60 times, and the thickness of the obtained coating is about 0.6-0.8 mm (in which 0.8 mm is the thickness required for lathe grinding);

More preferably, the spraying parameters in step (3) are as follows: a main spraying gas is argon and the gas flow is 60 L·min$^{-1}$; a secondary gas is hydrogen, and the gas flow is 15 L·min$^{-1}$; a powder feeding gas is argon, and a spraying distance is 150 mm; the powder feeding amount of the two spraying feed materials is pure Al$_2$O$_3$: the composite powder is 3.6: 12 g·min$^{-1}$; a spraying voltage is 100 V; a spraying current is 420 A; the second powder feeder has an axial distance a of 100 mm, a radial distance r of 2.5 mm, and a jet angle θ of 90°, and the temperature of the matrix is 120° C. The test of the more preferred embodiment can be seen in embodiment 2 and FIG. 11 below.

Preferably, step (4) in the method for preparing Al$_2$O$_3$—PF composite coating is as follows:

(4-1) the melting point of pure Al$_2$O$_3$ is about 2050° C., so the pure Al$_2$O$_3$ powders are fed in a manner of feeding the powder inside the spray gun, and melted and obtains a flight speed in high-temperature high-speed plasma jet flow; the Al$_2$O$_3$—PF composite powders are fed in a manner of feeding the powder outside the spray gun and are fed in a "low-temperature zone" so as to ensure that the PF resin is melted, but not decomposed by heating;

(4-2) in the process of spraying, the pure Al$_2$O$_3$ and the Al$_2$O$_3$—PF composite powders are sprayed once respectively in a manner of alternately spraying;

(4-3) the pure Al$_2$O$_3$ powders have an ideal melting degree and a flight speed under the action of high-temperature high-speed plasma jet flow. The Al$_2$O$_3$—PF composite powders are in a "low-temperature zone", thus the Al$_2$O$_3$ in the composite powder is insufficient melted, but the PF resin is kept by Al$_2$O$_3$ as much as possible and well melted, so as to form a coating structure with Al$_2$O$_3$ as the skeleton and filled with the PF resin, thereby improving the heat resistance and bonding strength of the coating.

Correspondingly, the disclosure also provides a preparation device of a composite coating for a resin matrix composite for implementing each step in the previous preparation method, that is, the preparation device can include, but is not limited to, a spray granulating device for preparing the composite powder of the disclosure, a powder sieve, a device for pretreatment of a matrix, and an exemplary SAPS spraying device shown in FIG. 5. It can be understood that in order to perform any step of the previous preparation method, the disclosure does not limit the compositions and structures of the sub device or sub components of the preparation device.

Figure 15:
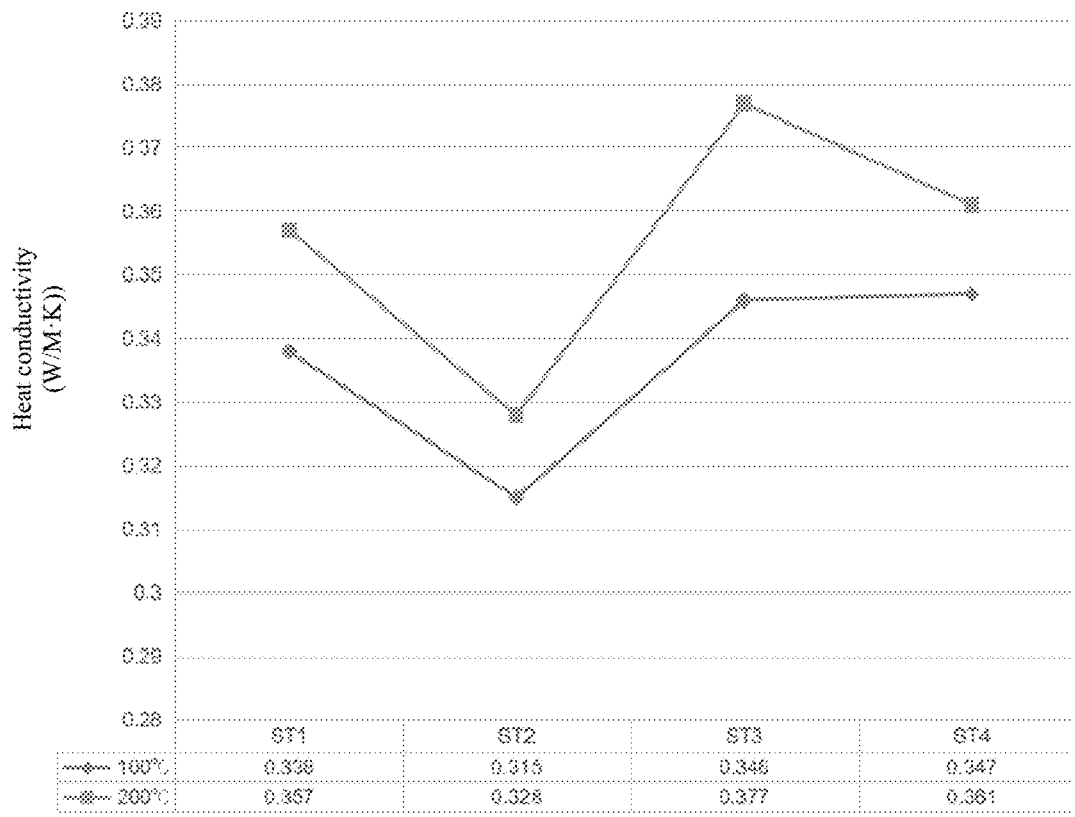
FIG. 15 shows thermal conductivities of pure $Al_2O_3$ powders and $Al_2O_3$—PF composite powders in different ratios.
Figure 16:
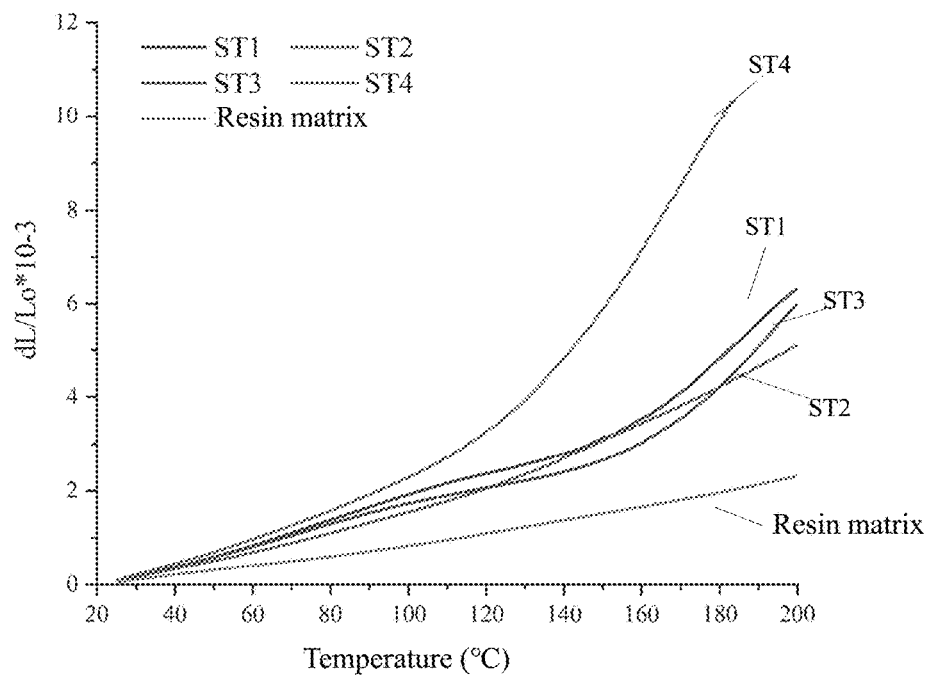
FIG. 16 shows thermal expansion coefficients of pure $Al_2O_3$ powders and $Al_2O_3$—PF composite powders in different ratios.

The following examples all use the same Al$_2$O$_3$—PF composite powder, matrix surface pretreatment and optimized spraying parameters, but the proportions of the powder feeding amounts of the pure Al$_2$O$_3$ in the first powder feeder and the Al$_2$O$_3$—PF composite powder in the second powder feeder in different embodiments are different. FIG. 15 shows the thermal conductivities of the pure Al$_2$O$_3$ powder and the Al$_2$O$_3$—PF composite powder in different ratios, and FIG. 16 shows the thermal expansion coefficients of the pure Al$_2$O$_3$ powder and the Al$_2$O$_3$—PF composite powder in different ratios.

Example 1

Under the condition that the above process parameters are adopted:

ST1 process is as follows: a ratio of spraying pure Al$_2$O$_3$ to Al$_2$O$_3$—PF composite powder is 3.6:5.4 g/min. Table 1 and Table 2 show heat resistance and mechanical properties of a coating prepared by the ST1 process, respectively.

TABLE 1

Heat resistance of coating prepared by ST1 process

| Process | Heat conductivity (W/(m*K)) 100° C. | Heat conductivity (W/(m*K)) 200° C. | Thermal expansion coefficient (1/K) 25-100° C. | Thermal expansion coefficient (1/K) 25-200° C. | 100° C. Transient | 200° C. Transient |
|---|---|---|---|---|---|---|
| ST1 | 0.338 | 0.357 | $24.529*10^{-6}$ | $35.762*10^{-6}$ | $2.545*10^{-5}$ | $7.141*10^{-5}$ |
| Resin matrix | — | — | $10.498*10^{-6}$ | $13.014*10^{-6}$ | $1.206*10^{-5}$ | $1.895*10^{-5}$ |

TABLE 2

Mechanical properties of coating prepared by ST1 process

| Process | $Al_2O_3$:$Al_2O_3$-PF (g/min) | Elasticity modulus/ GPa | Bonding strength/ MPa | Shear strength/ MPa |
|---|---|---|---|---|
| ST1 | 3.6:5.4 | 20.147 | 10.397 | 6.562 |

From the data in Table 1 and Table 2, it can be seen that the ceramic resin-composite coating prepared by the ST1 process has a good heat insulation ability and a low thermal conductivity, and has a bonding strength of 10.397 MPa.

Example 2

Figure 11:
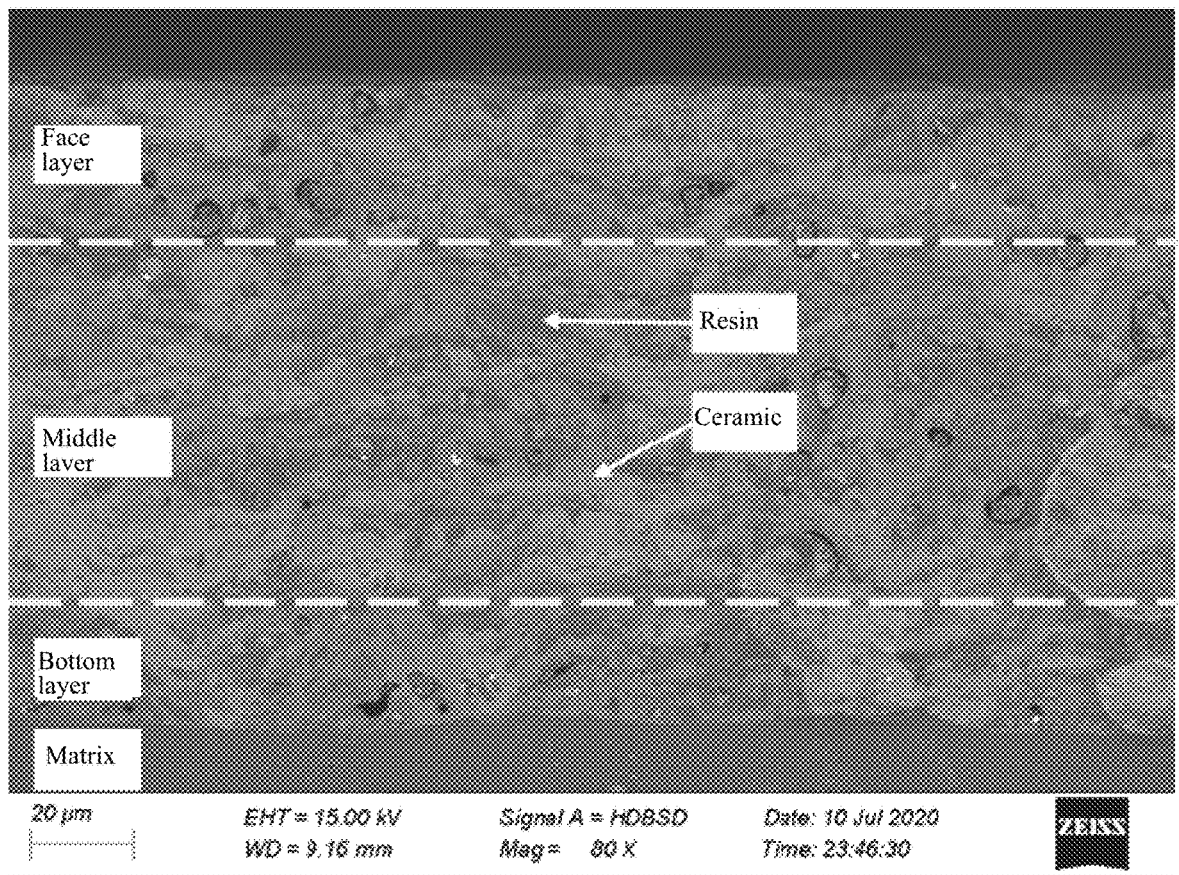
FIG. 11 is a flat pattern of a composite coating prepared in example 2 according to the disclosure.

Under the condition that the above process parameters are adopted:

ST1 process is as follows: a ratio of spraying pure $Al_2O_3$ to $Al_2O_3$—PF composite powder is 3.6:12.0 g/min. As shown in FIG. 11, it shows manifestation of the $Al_2O_3$—PF composite coating prepared in this ratio. Table 3 and Table 4 show heat resistance and mechanical properties of a coating prepared by the ST1 process, respectively.

TABLE 3

Heat resistance of coating prepared by ST2 process

| Process | Heat conductivity (W/(m*K)) 100° C. | Heat conductivity (W/(m*K)) 200° C. | Thermal expansion coefficient (1/K) 25-100° C. | Thermal expansion coefficient (1/K) 25-200° C. | 100° C. Transient | 200° C. Transient |
|---|---|---|---|---|---|---|
| ST2 | 0.315 | 0.328 | $19.619*10^{-6}$ | $28.828*10^{-6}$ | $2.270*10^{-5}$ | $4.933*10^{-5}$ |
| Resin matrix | — | — | $10.498*10^{-6}$ | $13.014*10^{-6}$ | $1.206*10^{-5}$ | $1.895*10^{-5}$ |

TABLE 4

Mechanical properties of coating prepared by ST2 process

| Process | $Al_2O_3$:$Al_2O_3$-PF (g/min) | Elasticity modulus/ GPa | Bonding strength/ MPa | Shear strength/ MPa |
|---|---|---|---|---|
| ST2 | 3.6:12.0 | 27.604 | 26.035 | 15.867 |

From the data in Table 3 and Table 4, it can be seen that the ceramic resin-composite coating prepared by the ST2 process has a good heat insulation ability and a low thermal conductivity, and has a bonding strength of 26.035 MPa.

Example 3

Under the condition that the above process parameters are adopted:

ST3 process is as follows: a ratio of spraying pure $Al_2O_3$ to $Al_2O_3$—PF composite powder is 3.6:14.2 g/min. Table 5 and Table 6 show heat resistance and mechanical properties of a coating prepared by the ST3 process, respectively.

TABLE 5

Heat resistance of coating prepared by ST3 process

| Process | Heat conductivity (W/(m*K)) | | Thermal expansion coefficient (1/K) | | | |
|---|---|---|---|---|---|---|
| | 100° C. | 200° C. | 25-100° C. | 25-200° C. | 100° C. Transient | 200° C. Transient |
| ST3 | 0.346 | 0.328 | $19.619*10^{-6}$ | $28.828*10^{-6}$ | $2.270*10^{-5}$ | $4.933*10^{-5}$ |
| Resin matrix | — | — | $10.498*10^{-6}$ | $13.014*10^{-6}$ | $1.206*10^{-5}$ | $1.895*10^{-5}$ |

From the data in Table 5 and Table 6, it can be seen that the ceramic resin-composite coating prepared by the ST3 process has a good heat insulation ability and a low thermal conductivity, and has a bonding strength of 24.673 MPa.

Example 4

Under the condition that the above process parameters are adopted:

ST4 process is as follows: a ratio of spraying pure $Al_2O_3$ to $Al_2O_3$—PF composite powder is 3.6:32.4 g/min. Table 7 and Table 8 show heat resistance and mechanical properties of a coating prepared by the ST4 process, respectively.

TABLE 7

Heat resistance of coating prepared by ST4 process

| Process | Heat conductivity (W/(m*K)) | | Thermal expansion coefficient (1/K) | | | |
|---|---|---|---|---|---|---|
| | 100° C. | 200° C. | 25-100° C. | 25-200° C. | 100° C. Transient | 200° C. Transient |
| ST3 | 0.346 | 0.328 | $19.619*10^{-6}$ | $28.828*10^{-6}$ | $2.270*10^{-5}$ | $4.933*10^{-5}$ |
| Resin matrix | — | — | $10.498*10^{-6}$ | $13.014*10^{-6}$ | $1.206*10^{-5}$ | $1.895*10^{-5}$ |

From the data in Table 7 and Table 8, it can be seen that the ceramic resin-composite coating prepared by the ST4 process has a good heat insulation ability and a low thermal conductivity, and has a bonding strength of 17.018 MPa.

Comparisons of corresponding performance test results of four $Al_2O_3$—PF composite coatings prepared by the above four processes are as shown in Table 9 and Table 10.

TABLE 9

Effect of proportion change of $Al_2O_3$ and $Al_2O_3$-PF composite powder on heat resistance of coating

| Process | $Al_2O_3$:$Al_2O_3$-PF (g/min) | Heat conductivity (W/(m*K)) | | Thermal expansion coefficient (1/K) | | | |
|---|---|---|---|---|---|---|---|
| | | 100° C. | 200° C. | 25-100° C. | 25-200° C. | 100° C. Transient | 200° C. Transient |
| ST1 | 3.6:5.4 | 0.338 | 0.357 | $24.529*10^{-6}$ | $35.762*10^{-6}$ | $2.545*10^{-5}$ | $7.141*10^{-5}$ |
| ST2 | 3.6:12.0 | 0.315 | 0.328 | $19.619*10^{-6}$ | $28.828*10^{-6}$ | $2.270*10^{-5}$ | $4.933*10^{-5}$ |
| ST3 | 3.6:14.2 | 0.346 | 0.377 | $21.989*10^{-6}$ | $33.923*10^{-6}$ | $1.852*10^{-5}$ | $9.575*10^{-5}$ |
| ST4 | 3.6:32.4 | 0.347 | 0.361 | $29.315*10^{-6}$ | $64.996*10^{-6}$ | $3.899*10^{-5}$ | $3.828*10^{-5}$ |
| | Resin matrix | — | — | $10.498*10^{-6}$ | $13.014*10^{-6}$ | $1.206*10^{-5}$ | $1.895*10^{-5}$ |

By changing the proportions of pure $Al_2O_3$ and $Al_2O_3$—PF composite powder during the spraying, the content of $Al_2O_3$ in the coating is changed, and the obtained that there are significant differences in the thermal properties of different coatings. Among them, the composite coating prepared by the ST2 process has the lowest thermal conductivity and thermal expansion coefficient, which is closest to a thermal expansion curve of a resin matrix material, as shown in FIG. 16.

TABLE 10

Effect of proportion change of $Al_2O_3$ and $Al_2O_3$-PF composite powder on mechanical properties of coating

| Process | $Al_2O_3$:$Al_2O_3$-PF (g/min) | Elasticity modulus/ GPa | Bonding strength/ MPa | Shear strength/ MPa |
|---|---|---|---|---|
| ST1 | 3.6:5.4 | 20.147 | 10.397 | 6.562 |
| ST2 | 3.6:12.0 | 27.604 | 26.035 | 15.867 |
| ST3 | 3.6:14.2 | 28.730 | 24.673 | 14.352 |
| ST4 | 3.6:32.4 | 30.269 | 17.018 | 13.320 |

By changing the proportion of pure $Al_2O_3$ and $Al_2O_3$—PF composite powder during the spraying, the content of $Al_2O_3$ in the coating is changed. There are obvious differences in the thermal properties of different coatings. Among them, the composite coating prepared by the ST2 process has the highest elastic modulus, bonding strength and shear strength. FIG. 14 is a graph showing the micron indentation morphology of the composite coating prepared by the ST2 process.

Although the embodiment of the disclosure has been disclosed as above, it is not limited to the applications listed in the description and embodiments. It can be fully applicable to various fields suitable for the disclosure. For those familiar with the art, other modifications can be easily realized. Therefore, the disclosure is not limited to specific details and the illustrations shown and described here without departing from the general concepts defined by the claims and equivalent scope.

We claim:

1. A preparation method of a composite coating for a resin matrix composite, comprising the following steps:
    preparing ceramic-resin composite powders which comprise $Al_2O_3$ ceramic, a thermosetting resin and a curing agent, wherein the thermosetting resin is phenolic resin PF and the ceramic-resin composite powders are semi-thermosetting resin powders; and
    respectively spraying pure $Al_2O_3$ ceramic powders and the ceramic-resin composite powders on the surface of the resin matrix composite by supersonic atmospheric plasma spraying to form a ceramic-resin composite coating, wherein the pure $Al_2O_3$ ceramic powders are fed into jet flow in a manner of feeding powder inside a spray gun, and the ceramic-resin composite powders are fed into jet flow in a manner of feeding powder outside the spray gun;
    wherein, the supersonic atmospheric plasma spraying comprises the following steps:
    spraying the ceramic-resin composite powders and the pure $Al_2O_3$ ceramic powders, and changing an addition amount proportion of each powder so that ceramic and resin components in the composite coating realizes continuous gradient change;
    wherein, the ceramic-resin composite powders in the composite coating gradually decreases from 100% to 0%, and the pure $Al_2O_3$ ceramic powders in the coating gradually increases from 0% to 100%;
    wherein, the supersonic atmospheric plasma spraying also comprises the following steps:
    alternatively spraying the composite powders and the pure $Al_2O_3$ ceramic powders for 50 times to 60 times to form a multi-layer structure.

2. The preparation method of the composite coating for the resin matrix composite according to claim 1, wherein the preparing ceramic-resin composite powders also comprises the following steps:
    mixing the $Al_2O_3$ ceramic, the thermosetting resin and the curing agent, granulating via agglomeration, drying and forming;
    wherein, a ratio of the $Al_2O_3$ ceramic to the thermosetting resin to the curing agent is 50.000%: 45.455%: 4.545%; the curing agent is hexamethylenetetramine; and
    screening the $Al_2O_3$ ceramic, the thermosetting resin and the curing agent after being mixed through a powder sieve to obtain the composite powders with a particle size of 0.3-70 μm and a core-shell structure.

3. The preparation method of the composite coating for the resin matrix composite according to claim 1, wherein,
    a main spraying gas is argon, and the gas flow of the argon is 58 L·min⁻¹-62 L·min⁻¹; a secondary gas is hydrogen, and the gas flow of the hydrogen is 12 L·min⁻¹-18 L·min⁻¹; a powder feeding gas is argon, and a spraying distance is 140-160 mm;
    the pure $Al_2O_3$ ceramic powders are fed by a first powder feeder, and the composite powders are fed by a second powder feeder; wherein, the pure $Al_2O_3$ ceramic powder: the powder feeding amount of the composite powder is 3.6:5.4 g·min⁻¹-3.6: 20 g·min⁻¹; a spraying voltage is 90-110 V; a spraying current is 350-450 A; the second powder feeder has an axial distance of 90-110 mm; the temperature of the resin matrix composite is 100-150° C.

4. The preparation method of the composite coating for the resin matrix composite according to claim 3, wherein,
    the gas flow of the argon is 60 L·min⁻¹; the gas flow of the hydrogen is 15 L·min⁻¹; the spraying distance is 150 mm;
    the pure $Al_2O_3$ ceramic powder: the powder feeding amount of the composite powder is 3.6: 12 g·min⁻¹; a spraying voltage is 100 V; a spraying current is 420 A; the second powder feeder has an axial distance of 20-120 mm, a radial distance of 1-12 mm and a jet flow angle of 70-100°; the temperature of the resin matrix composite is 90-150° C.

5. The preparation method of the composite coating for the resin matrix composite according to claim 1, wherein,
    the surface of the resin matrix composite is subjected to linear reciprocating spraying by using a supersonic atmospheric plasma spray gun, and the movement speed of the spray gun is 40 m/min;
    the times of the spraying is 50-60 times, and the thickness of the obtained coating is 0.6-0.8 mm.

6. The preparation method of the composite coating for the resin matrix composite according to claim 1, wherein,
    prior to the supersonic atmospheric plasma spraying, the preparation method also comprises the following steps:
    pretreating the surface of the resin matrix composite;
    the pretreating comprises performing washing and sand blasting treatment on the surface of the resin matrix composite.

7. The preparation method of the composite coating for the resin matrix composite according to claim 6, wherein, the pretreating comprises:
    washing the surface of the matrix with ethyl alcohol or acetone;
    a sand blasting material selects brown aluminum oxide with a particle size of 120-180 μm, a sand blasting atmospheric pressure of 0.3±0.05 MPa and a sand blasting angle of 70±10°, a distance between the spray gun and the surface of the resin matrix composite is 100-150 μm, and the sand blasting time is once for flat sweeping.

* * * * *